US008789045B2

(12) United States Patent
Machida

(10) Patent No.: US 8,789,045 B2
(45) Date of Patent: Jul. 22, 2014

(54) REJUVENATION PROCESSING DEVICE, REJUVENATION PROCESSING SYSTEM, COMPUTER PROGRAM, AND DATA PROCESSING METHOD

(75) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 13/260,659

(22) PCT Filed: Mar. 15, 2010

(86) PCT No.: PCT/JP2010/001832
§ 371 (c)(1),
(2), (4) Date: Sep. 27, 2011

(87) PCT Pub. No.: WO2010/122710
PCT Pub. Date: Oct. 28, 2010

(65) Prior Publication Data
US 2012/0023495 A1    Jan. 26, 2012

(30) Foreign Application Priority Data
Apr. 23, 2009  (JP) ................................. 2009-104695

(51) Int. Cl.
*G06F 9/455* (2006.01)
(52) U.S. Cl.
USPC .................................................. 718/1; 714/1
(58) Field of Classification Search
USPC .................................................. 714/1; 718/1
See application file for complete search history.

(56) References Cited

U.S. PATENT DOCUMENTS

| 6,594,784 B1 * | 7/2003 | Harper et al. ................. 714/47.2 |
| 7,100,079 B2 | 8/2006 | Gross et al. |
| 8,112,527 B2 | 2/2012 | Kawato |

(Continued)

FOREIGN PATENT DOCUMENTS

| JP | 04-024732 A | 1/1992 |
| JP | 07-078037 A | 3/1995 |

(Continued)

OTHER PUBLICATIONS

Kenichi Kourai, Shigeru Chiba, A Fast Rejuvenation Technique for Server Consolidation with Virtual Machines, 37th Annual IEEE/IFIP International Conference on Dependable Systems and Networks (DSN'07) © 2007.*

(Continued)

*Primary Examiner* — Emerson Puente
*Assistant Examiner* — Charlie Sun
(74) *Attorney, Agent, or Firm* — Foley & Lardner LLP

(57) ABSTRACT

In a rejuvenation processing device (1), at least one host machine (3) is selected as an object to be rejuvenated from among each of the host machines (3). At least one virtual machine (302) is selected from among the virtual machines (302) operating in the host machine (3) which is not selected as an object to be rejuvenated. The operation of the selected virtual machine (302) is stopped, and the virtual machine (302) operating in the host machine (3) selected as the object to be rejuvenated is migrated to the host machine (3) in which the virtual machine (302) operates. The host machine (3) selected as the object to be rejuvenated is rejuvenated. Thereby, it is possible to provide a rejuvenation processing device capable of simultaneously rejuvenating the host machines and the virtual machines necessary to be rejuvenated, while continuously operating the host machines and the virtual machines which are not necessary to be rejuvenated.

12 Claims, 8 Drawing Sheets

(56) References Cited

U.S. PATENT DOCUMENTS

| | | | |
|---|---|---|---|
| 8,171,349 | B2 | 5/2012 | Stern et al. |
| 8,327,354 | B1 | 12/2012 | Magenheimer et al. |
| 2002/0087913 | A1 | 7/2002 | Harper et al. |
| 2003/0079154 | A1* | 4/2003 | Park et al. .......................... 714/1 |
| 2004/0003319 | A1 | 1/2004 | Ukai et al. |
| 2005/0251802 | A1 | 11/2005 | Bozek et al. |
| 2006/0130044 | A1* | 6/2006 | Avritzer et al. ............... 717/168 |
| 2006/0155912 | A1 | 7/2006 | Singh et al. |
| 2007/0083794 | A1 | 4/2007 | Yu |
| 2007/0220121 | A1* | 9/2007 | Suwarna ....................... 709/220 |
| 2008/0163004 | A1* | 7/2008 | Yu .................................. 714/38 |
| 2009/0044265 | A1 | 2/2009 | Ghosh et al. |
| 2010/0070725 | A1 | 3/2010 | Prahlad et al. |
| 2010/0094948 | A1 | 4/2010 | Ganesh et al. |
| 2012/0030335 | A1 | 2/2012 | Machida |

FOREIGN PATENT DOCUMENTS

| | | |
|---|---|---|
| JP | 8-95814 A | 4/1996 |
| JP | 09-305218 A | 11/1997 |
| JP | 2000-222376 A | 8/2000 |
| JP | 2001-188684 A | 7/2001 |
| JP | 2004-30363 A | 1/2004 |
| JP | 2007-536657 A | 12/2007 |
| JP | 2008-217302 A | 9/2008 |
| JP | 2008-299791 A | 12/2008 |
| JP | 2009-80704 A | 4/2009 |
| WO | WO-2007/136021 A1 | 11/2007 |

OTHER PUBLICATIONS

Luis Moura Silva, Javier Alonso, Paulo Silva , Jordi Torres, Artur Andrzejak, Using Virtualization to Improve Software Rejuvenation, 2007, Sixth IEEE International Symposium on Network Computing and Applications (NCA 2007).*

Thandar Thein, Sung-Do Chi, Jong Sou Park, Availability Modeling and Analysis on Virtualized Clustering with Rejuvenation, 2008, IJCSNS International Journal of Computer Science and Network Security, vol. 8 No. 9, p. 72-80.*

Fumio Machida, Dong Seong Kim, Jong Sou Park, Kishor S. Trivedi, Toward Optimal Virtual Machine Placement and Rejuvenation Scheduling in a Virtualized Data Center, 2008, IEEE.*

USPTO Office Action, U.S. Appl. No. 13/262,146, Feb. 4, 2013, 16 pages.

USPTO Office Action, U.S. Appl. No. 13/262,146, Jun. 3, 2013, 14 pages.

* cited by examiner

FIG. 3

| HOST MACHINE | VIRTUAL MACHINE | AGING CHARACTERISTICS |
|---|---|---|
| host01 | vm01 | A |
| host01 | vm02 | B |
| host02 | vm03 | C |
| host02 | vm04 | A |
| host03 | vm05 | B |
| host03 | vm06 | D |

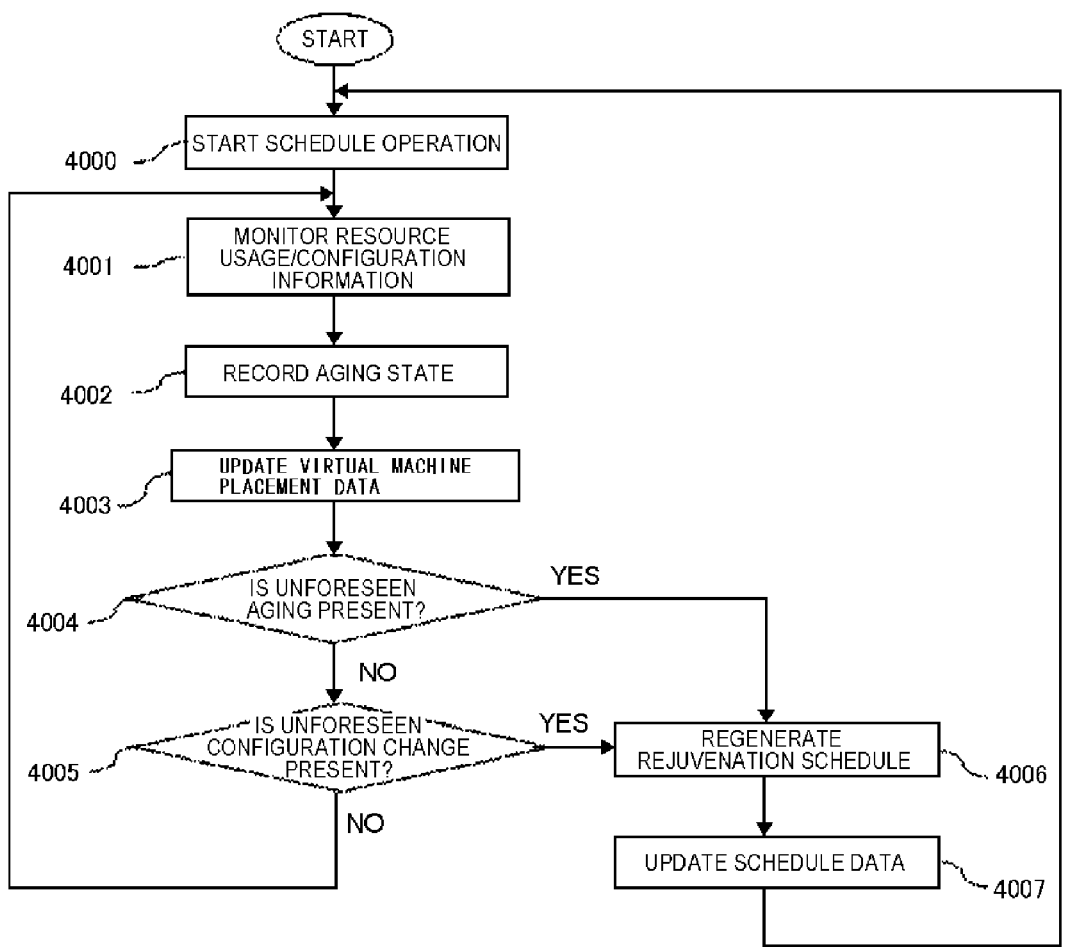

US 8,789,045 B2

REJUVENATION PROCESSING DEVICE, REJUVENATION PROCESSING SYSTEM, COMPUTER PROGRAM, AND DATA PROCESSING METHOD

This application is the National Phase of PCT/JP2010/001832, filed Mar. 15, 2010, which claims priority to Japanese Application No. 2009-104695, filed Apr. 23, 2009, the disclosures of which are hereby incorporated by reference in their entirety.

TECHNICAL FIELD

The present invention relates to a rejuvenation processing device that integrally controls a plurality of host machines, and particularly relates to a rejuvenation processing device that integrally controls a plurality of host machines composed of hardware in which at least one virtual machine operates by software, a rejuvenation processing system having the rejuvenation processing device, a computer program of the rejuvenation processing device, and a data processing method.

BACKGROUND ART

When online applications and the like which continue to provide long-term services are hosted in a data center, reliability or availability of the data center is important. In the related art, as methods of making a system highly reliable, although a redundancy or clustering technique, a fault recovery method and the like are used, a reliability management method adapted to a configuration of a complicated data center is required.

Particularly, in recent years, in a data center server integration has increasingly been performed by a server virtualization function, and thus the reliability management of a virtual machine or virtualization software has become a new challenge. The virtualization software is software for creating a plurality of virtual machines on a host machine to operate them, and requires high reliability for stably operating the virtual machines.

As a problem specific to software continuously operating for a long period of time such as a virtual machine or virtualization software, there is a degradation phenomenon of the operating environment due to an aging related bug. The aging related bug means a bug which generates performance degradation, obstacles or the like by the continuous operation for a long period of time.

There may be a case in which it is difficult to completely remove the aging related bug at the time of debugging thereof, and particularly in software such as libraries which a third party develops, the existence of bugs can be confirmed but it is difficult to remove the bugs.

As an effective solution to the aging related bug, software rejuvenation is known. Software rejuvenation is a method to prevent or postpone failures caused by aging-related bugs by resetting the internal state or the operating environment of the aged software. Since downtime occurs in rejuvenation processing itself in the software rejuvenation, it is necessary to schedule the rejuvenation at an appropriate timing or interval.

Consequently, there is a method of preventing failures by periodically executing the rejuvenation processing on the basis of the operating time of software (see, for example, Patent Document 1). In addition, there is also a method of normalizing an operation by monitoring the application operation and restarting a process (see, for example, Patent Document 2).

RELATED DOCUMENT

Patent Document

[Patent Document 1] Japanese Unexamined Patent Publication No. 2001-188684
[Patent Document 2] Japanese Unexamined Patent Publication No. 08-095814

DISCLOSURE OF THE INVENTION

However, when the rejuvenation method in the related art is applied to the virtualization software as it is, there is a problem that the virtual machine has to be stopped unnecessarily due to the rejuvenation of the virtualization software (rejuvenation of the host machine).

Since the virtual machine runs on the virtualization software (on the host machine), it is necessary to stop all the virtual machines at the time of the stop of the virtualization software. The unnecessary stop of the virtual machine leads to an increase in the downtime of the entire application system, and thus it is not desirable from the viewpoint of an improvement in the availability.

As another problem, there may be a case in which the rejuvenation method in the related art cannot be applied to the virtualization software as it is. The reason is because the virtual machine or the application operating on the virtual machine is dependent on the virtualization software, and it is also necessary to consider the state of the virtual machine or the application at the time of the rejuvenation of the virtualization software.

As still another problem, there may be a case in which the downtime of the virtual machine is increased unnecessarily due to the rejuvenation of the virtualization software. The reason is because appropriate timing of the rejuvenation is present respectively in the virtual machine and the application operating the virtual machine, and does not necessarily coincide with the timing of the rejuvenation of the virtualization software.

As still another problem, there may be a case in which costs are involved for high reliability by duplexing or multiplexing. The reason is because even when a duplexing or multiplexing configuration is taken by the virtual machine, a computer resource for operating the virtual machine is required, and costs rise due to an increase in the number of host machines, or increases in power consumption, cooling costs, and management and maintenance costs.

The invention is contrived in view of the problems as described above, and an object thereof is to provide a rejuvenation processing device capable of simultaneously rejuvenating the host machines and the virtual machines which are necessary to be rejuvenated while continuously operating the host machines and the virtual machines which are not necessary to be rejuvenated, a rejuvenation processing system having the rejuvenation processing device, a computer program of the rejuvenation processing device, and a data processing method.

A rejuvenation processing device according to the invention is a device that controls a plurality of host machines in which a virtual machine operates, including: host rejuvenation scheduling unit that selects at least one of the host machines as an object to be rejuvenated from among each of the host machines; virtual rejuvenation scheduling unit that selects at least one of the virtual machines from among the virtual machines operating the host machine which is not selected as the object to be rejuvenated; virtual machine migration unit that stops the operation of the selected virtual machine and migrates the virtual machine, operating in the host machine selected as the object to be rejuvenated, to the host machine in which the virtual machine operates; and rejuvenation execution unit that rejuvenates the host machine selected as the object to be rejuvenated.

A rejuvenation processing system according to the invention includes: a plurality of host machines in which a virtual machine operates; host rejuvenation scheduling unit that selects at least one of the host machines as an object to be rejuvenated from among each of the host machines; virtual rejuvenation scheduling unit that selects at least one of the virtual machines from among the virtual machines operating in the host machine which is not selected as the object to be rejuvenated; virtual machine migration unit that stops the operation of the selected virtual machine and migrates the virtual machine, operating the host machine selected as the object to be rejuvenated, to the host machine in which the virtual machine operates; and rejuvenation execution unit that rejuvenates the host machine selected as the object to be rejuvenated.

A computer program according to the invention is a program of a rejuvenation processing device that controls a plurality of host machines in which a virtual machine operates, the program causing the rejuvenation processing device to execute: a host rejuvenation scheduling process of selecting at least one of the host machines as an object to be rejuvenated from among each of the host machines; a virtual rejuvenation scheduling process of selecting at least one of the virtual machines from among the virtual machines operating in the host machine which is not selected as the object to be rejuvenated; a virtual migration process of stopping the operation of the selected virtual machine and migrating the virtual machine, operating the host machine selected as the object to be rejuvenated, to the host machine in which the virtual machine operates; and a rejuvenation execution process of rejuvenating the host machine selected as the object to be rejuvenated.

A data processing method according to the invention is a method of a rejuvenation processing device that controls a plurality of host machines in which a virtual machine operates, including: a host rejuvenation scheduling operation of selecting at least one of the host machines as an object to be rejuvenated from among each of the host machines; a virtual rejuvenation scheduling operation of selecting at least one of the virtual machines from among the virtual machines operating in the host machine which is not selected as the object to be rejuvenated; a virtual migration operation of stopping the operation of the selected virtual machine and migrating the virtual machine, operating in the host machine selected as the object to be rejuvenated, to the host machine in which the virtual machine operates; and a rejuvenation execution operation of rejuvenating the host machine selected as the object to be rejuvenated.

Meanwhile, various types of components of the invention may be formed so as to realize functions thereof, and can be realized as, for example, dedicated hardware exhibiting a predetermined function, a rejuvenation processing device to which a predetermined function is given by a computer program, a predetermined function realized in the rejuvenation processing device by the computer program, any combination thereof, and the like.

In addition, various types of components of the invention do not necessarily have to exist individually independently, and may be configured such that a plurality of components is formed as one member, one component is formed by a plurality of members, any component is a portion of other components, and a portion of any component and a portion of other components duplicate each other.

In addition, although a plurality of processes and operations is described in order in the computer program and the data processing method of the invention, the described order is not intended to limit the order of executing a plurality of processes and a plurality of operations.

For this reason, when the computer program and the data processing method according to the invention are carried out, it is possible to change the order of a plurality of processes and a plurality of operations thereof in the range without any trouble in terms of the contents.

Further, the computer program and the data processing method according to the invention are not limited to the execution at the timing where a plurality of processes and a plurality of operations are individually different. For this reason, other processes and operations may be generated during the execution of any process and operation, and a portion or all of the timing of executing any process and operation and the timing of executing other processes and operations may duplicate each other.

In the rejuvenation processing device of the invention, at least one host machine is selected as an object to be rejuvenated from among each of the host machines. At least one virtual machine is selected from among the virtual machines operating in the host machine which is not selected as an object to be rejuvenated. The operation of the selected virtual machine is stopped, and the virtual machine operating in the host machine selected as the object to be rejuvenated is migrated to the host machine in which the virtual machine operates. The host machine selected as the object to be rejuvenated is rejuvenated. For this reason, it is not necessary to stop all the virtual machines which operate at the time of rejuvenating the host machine and are not necessary to be rejuvenated. Therefore, it is possible to rejuvenate the host machine which is necessary to be rejuvenated while continuously operating the host machines and the virtual machines which are not necessary to be rejuvenated.

BRIEF DESCRIPTION OF THE DRAWINGS

The above-mentioned objects, other objects, features and advantages will be made clearer from the preferred embodiment described below, and the following accompanying drawings.

FIG. 3 is a characteristic diagram illustrating a relationship between a host machine and a virtual machine and aging characteristics.

FIG. 8 is a flow diagram illustrating a processing operation of the entire rejuvenation processing system.

DESCRIPTION OF EMBODIMENTS

Figure 1:
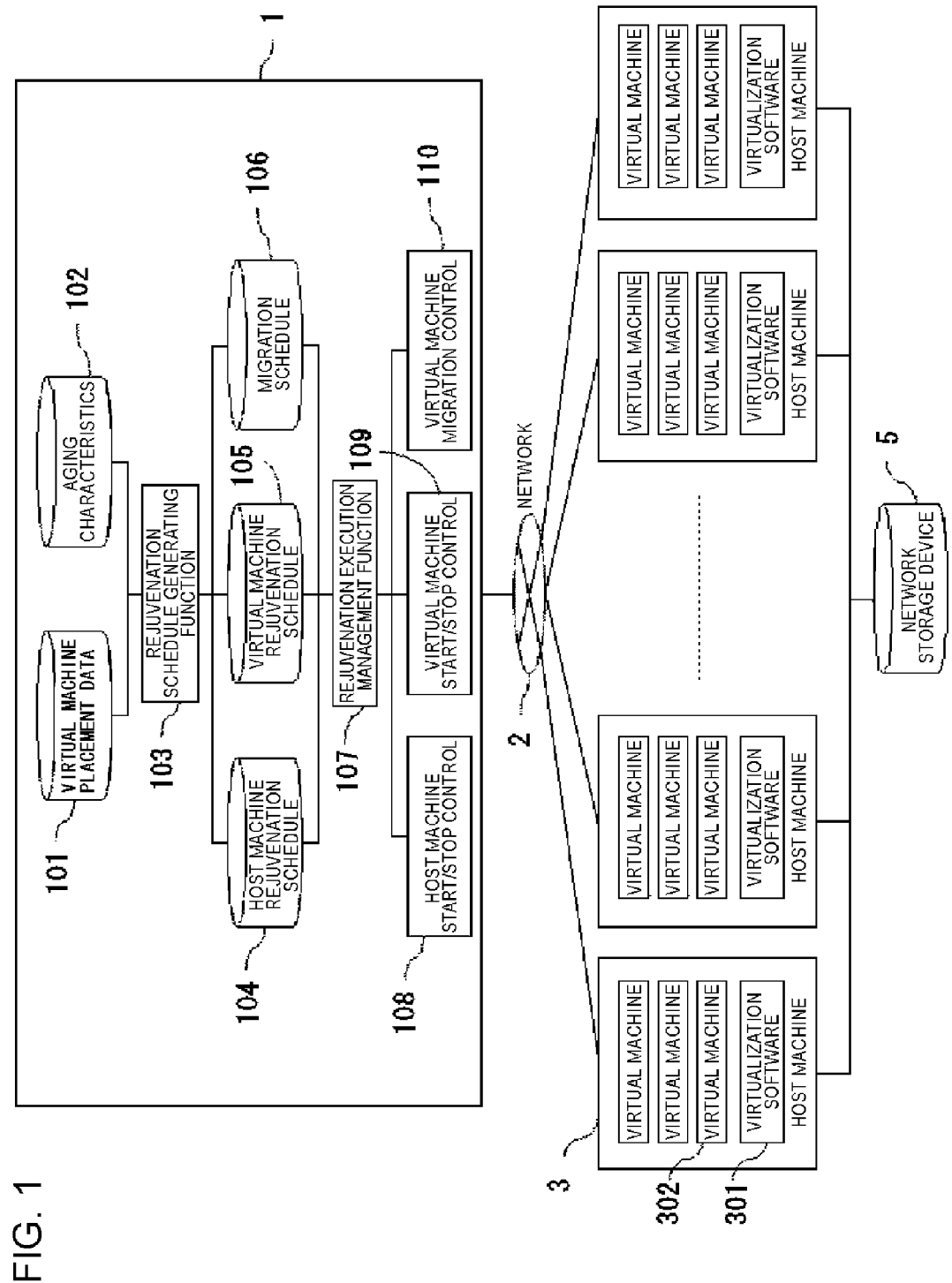
FIG. 1 is a schematic block diagram illustrating a logical structure of a rejuvenation processing system according to an embodiment of the invention.

An embodiment of the invention will be described below with reference to FIGS. 1 to 8. Referring to FIG. 1, a rejuvenation processing system according to the embodiment of the invention is constituted by a management server 1 which is a rejuvenation processing device operating by a program control, a communication network 2, a plurality of host machines 3, and a network storage device 5.

The management server 1 is connected to a plurality of host machines 3 through the communication network 2. In addition, a plurality of host machines 3 shares the network storage device 5. A plurality of host machines 3 is composed of hardware in which at least one virtual machine 302 operates by virtualization software 301 which is software. The management server 1 integrally controls a plurality of host machines 3 as described above.

Meanwhile, the management server 1 of the embodiment includes a host machine rejuvenation schedule 104 which is host rejuvenation scheduling unit that selects at least one host machine 3 as an object to be rejuvenated from among each of the host machines 3, a virtual machine rejuvenation schedule 105 which is virtual rejuvenation scheduling unit that selects at least one virtual machine 302 from among the virtual machines 302 operating in the host machine 3 which is not selected as an object to be rejuvenated, a migration schedule 106 which is virtual machine migration unit that stops the operation of the selected virtual machine 302 and migrates the virtual machine 302, operating in the host machine 3 selected as the object to be rejuvenated, to the host machine 3 in which the virtual machine 302 operates, and a rejuvenation execution management function 107 which is rejuvenation execution unit that rejuvenates the host machine 3 selected as the object to be rejuvenated.

Meanwhile, the host machine rejuvenation schedule 104 selects the host machine 3 rejuvenated by individually determining each of the aging states. In addition, the virtual machine rejuvenation schedule 105 selects the virtual machine 302 which is rejuvenated and the virtual machine 302 which is not rejuvenated by individually determining each of the aging states.

In more detail, the management server 1 also includes aging characteristics 102 in which aging characteristics are registered beforehand for each of a plurality of host machines 3, the host machine rejuvenation schedule 104 selects the host machine 3 rejuvenated in response to the registered aging characteristics, and the virtual machine rejuvenation schedule 105 selects the virtual machine 302 rejuvenated in response to the registered aging characteristics.

More specifically, the management server 1 includes a virtual machine placement data 101, a rejuvenation schedule generating function 103, a host machine start/stop control function 108, a virtual machine start/stop control function 109, and a virtual machine migration control function 110, in addition to each of the parts mentioned above.

A plurality of host machines 3 is connected in parallel to, for example, the communication network 2, and includes at least one virtualization software 301 and at least one or more virtual machines 302 therewith. These components operate roughly as follows.

The rejuvenation schedule generating function 103 reads the virtual machine placement data 101 and the aging characteristics 102, generates the host machine rejuvenation schedule 104, the virtual machine rejuvenation schedule 105 and the migration schedule 106, and stores them in the host machine rejuvenation schedule 104, the virtual machine rejuvenation schedule 105, and the migration schedule 106.

The rejuvenation execution management function 107 calls the host machine start/stop control function 108, the virtual machine start/stop control function 109, and the virtual machine migration control function 110 on the basis of generated schedule information, and operates the virtualization software 301 and the virtual machine 302.

The host machine start/stop control function 108 starts/stops the virtualization software 301 of the host machine 3 through the communication network 2. The start/stop of the virtualization software 301 corresponds to the start/stop of the host machine 3.

The virtual machine start/stop control function 109 operates the start/stop of the virtual machine 302 through the communication network 2. All the images of the virtual machine 302 are stored in the network storage device 5, and can be referenced by all of the host machines 3.

The virtual machine migration control function 110 operates the virtualization software 301 through the communication network 2, and migrates the virtual machine 302 to another host machine 3.

The virtual machine 302 temporarily enters a stopped state by the migration of the virtual machine 302, but the downtime caused by migration is much shorter than that by restart.

Meanwhile, a computer program of the management server 1 as described above is described as to, for example, causing the management server 1 to execute a host rejuvenation scheduling process of selecting at least one host machine 3 as an object to be rejuvenated from among each of the host machines 3, a virtual rejuvenation scheduling process of selecting at least one virtual machine 302 from among the virtual machines 302 operating the host machine 3 which is not selected as an object to be rejuvenated, a virtual migration process of stopping the operation of the selected virtual machine 302 and migrating the virtual machine 302, operating in the host machine 3 selected as the object to be rejuvenated, to the host machine 3 in which the virtual machine 302 operates, and a rejuvenation execution process of rejuvenating the host machine 3 selected as the object to be rejuvenated.

Figure 2:
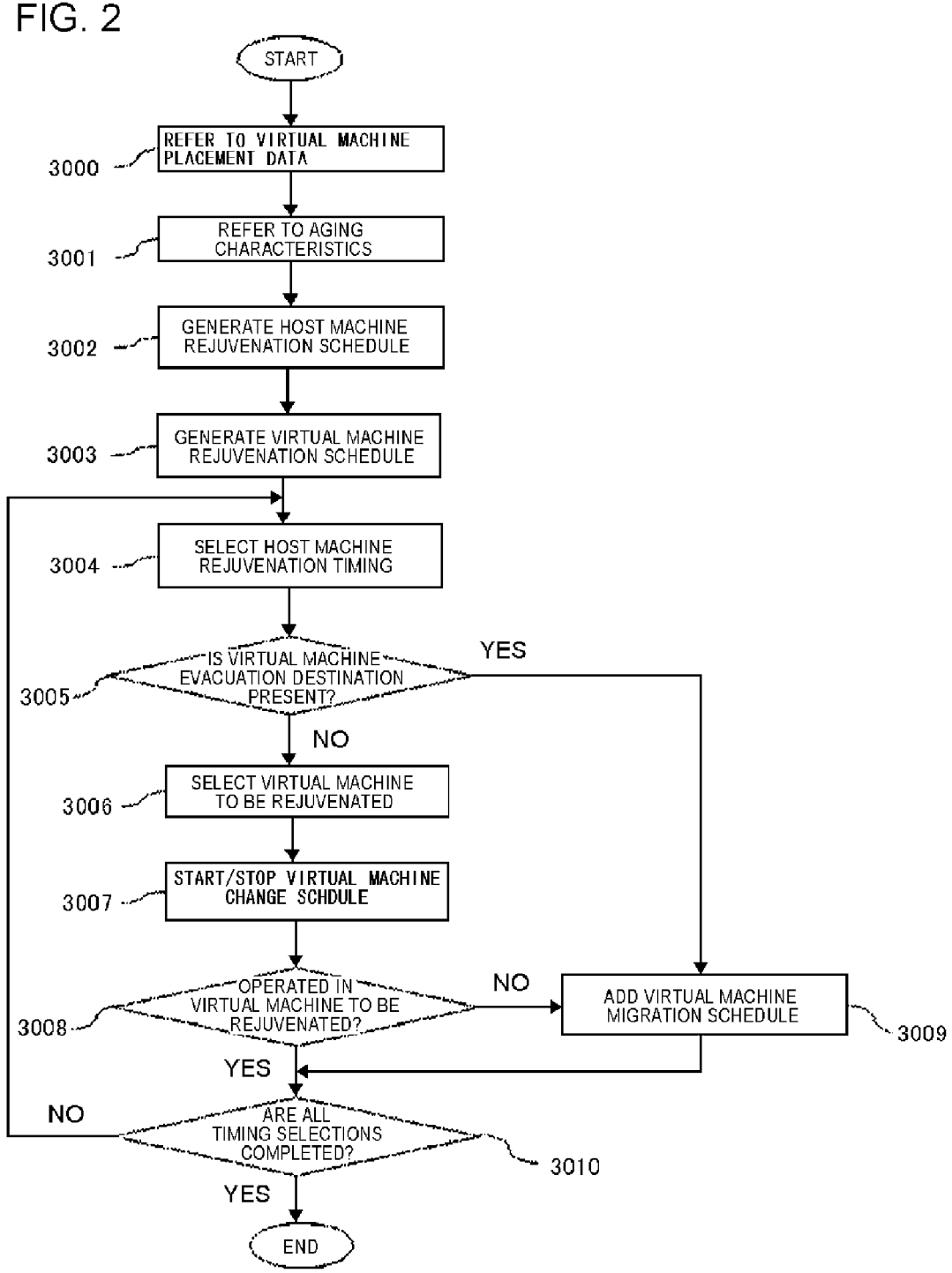
FIG. 2 is a flow diagram illustrating a processing operation of a rejuvenation schedule generating function.

Next, an operation of the rejuvenation processing system according to the embodiment will be described in detail with reference to a flow diagram of FIG. 2. First, the rejuvenation schedule generating function 103 refers to the virtual machine placement data 101 and the aging characteristics 102 (steps 3000 and 3001 of FIG. 2). An example of the virtual machine placement data 101 is shown in FIG. 3. In the configuration of FIG. 3, there are three host machines 3, and the sum total of six virtual machines 302 is hosted.

Next, the rejuvenation schedule generating function 103 creates a rejuvenation schedule of the host machine 3 on the basis of the given virtual machine placement data 101 and the aging characteristics 102 (step 3002).

Figure 4:
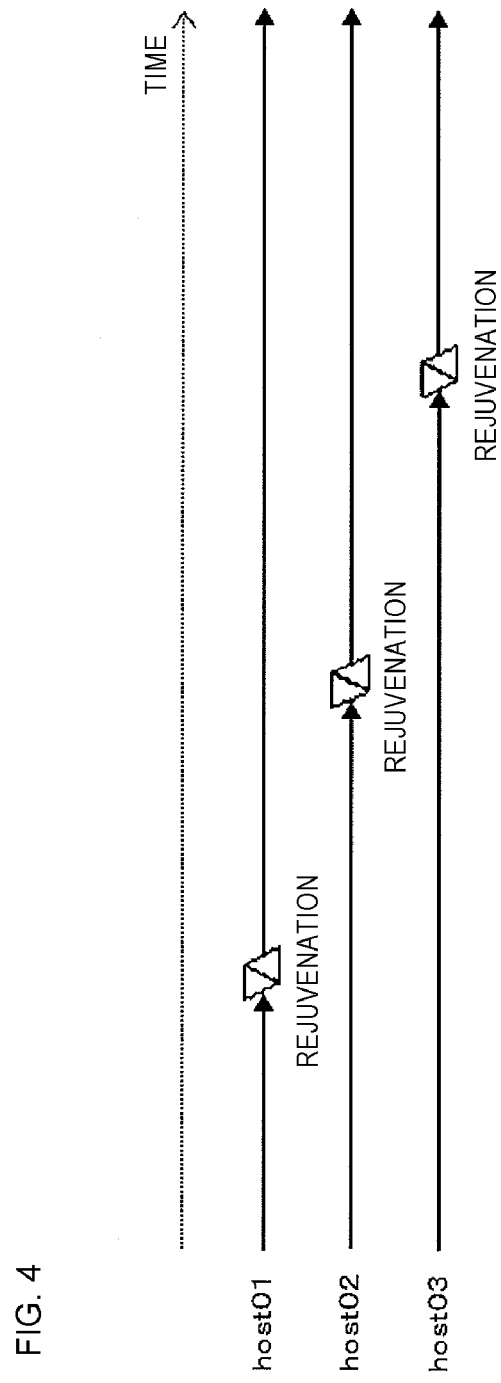
FIG. 4 is a time chart illustrating a rejuvenation schedule of the host machine.

Each of the host machines 3 is scheduled so as not to be simultaneously stopped. An example of the rejuvenation schedule of the host machine 3 is shown in FIG. 4. Next, simultaneously with step 3002, a rejuvenation schedule of the virtual machine 302 is created (step 3003).

However, the rejuvenation schedule of the virtual machine 302 created in this step is a tentative schedule based on only the aging characteristics 102 of the virtual machine 302, and is updated in the following step.

The update of rejuvenation schedule is performed by adjusting an evacuation destination of the virtual machine 302 at the timing of the rejuvenation of each host machine 3 on the basis of the rejuvenation schedule of the host machine 3. First, the closest rejuvenation timing of host machine 3 is selected (step 3004).

To evacuate the virtual machine 302 operating on the selected host machine 3 to another host, a free capacity on the other host machines 3 to execute the virtual machine 302 is searched from the virtual machine placement data 101 at that time. It is necessary that the examination of the free capacity be based on the virtual machine placement data 101 at that point in time.

Considering the current virtual machine placement data 101 and all migration schedules until that timing, it is possible to obtain the expected virtual machine placement data 101 at that timing.

If enough free capacity for evacuating all the hosted virtual machines 302 on the host machine 3 to be rejuvenated is found (step 3005-Y), new migration schedules for evacuating the virtual machines 302 is added before the beginning of the rejuvenation of the host machine 3 (step 3009).

On the other hand, when the enough free capacity does not exist (step 3005-N), a method of selecting and stopping the virtual machine 302 having a highest risk (for example, longest operating time) due to aging is taken. At this time, selection is performed in consideration of the capacity so that the selected virtual machine 302 can operate on one host machine 3 (step 3006).

For example, in the configuration example of FIG. 3, since the number of virtual machines 302 operating on each of the host machines 3 is two, two virtual machines 302 are selected as an object to be rejuvenated. The schedule is created so as to stop these virtual machines 302 just before the host machine 3 is stopped.

Further, after the host machine 3 is restarted, the schedule is created so as to start these virtual machines 302 on this host machine 3 (step 3007). Here, when the virtual machine 302 having the schedule set therein operates on the host machine 3 different from the host machine 3 to be rejuvenated, the migration schedule 106 for evacuating the virtual machine 302 operating on the host machine 3 is added to the free capacity of the stopped virtual machine 302.

The migration is scheduled after the virtual machine 302 is stopped and before the host machine 3 is stopped (steps 3008 and 3009). The procedures mentioned above are executed in order in accordance with the rejuvenation timing of each host machine 3, to repeat the correction of the rejuvenation schedule of the virtual machine 302 and the addition of the migration schedule 106 (step 3010).

Figure 5:
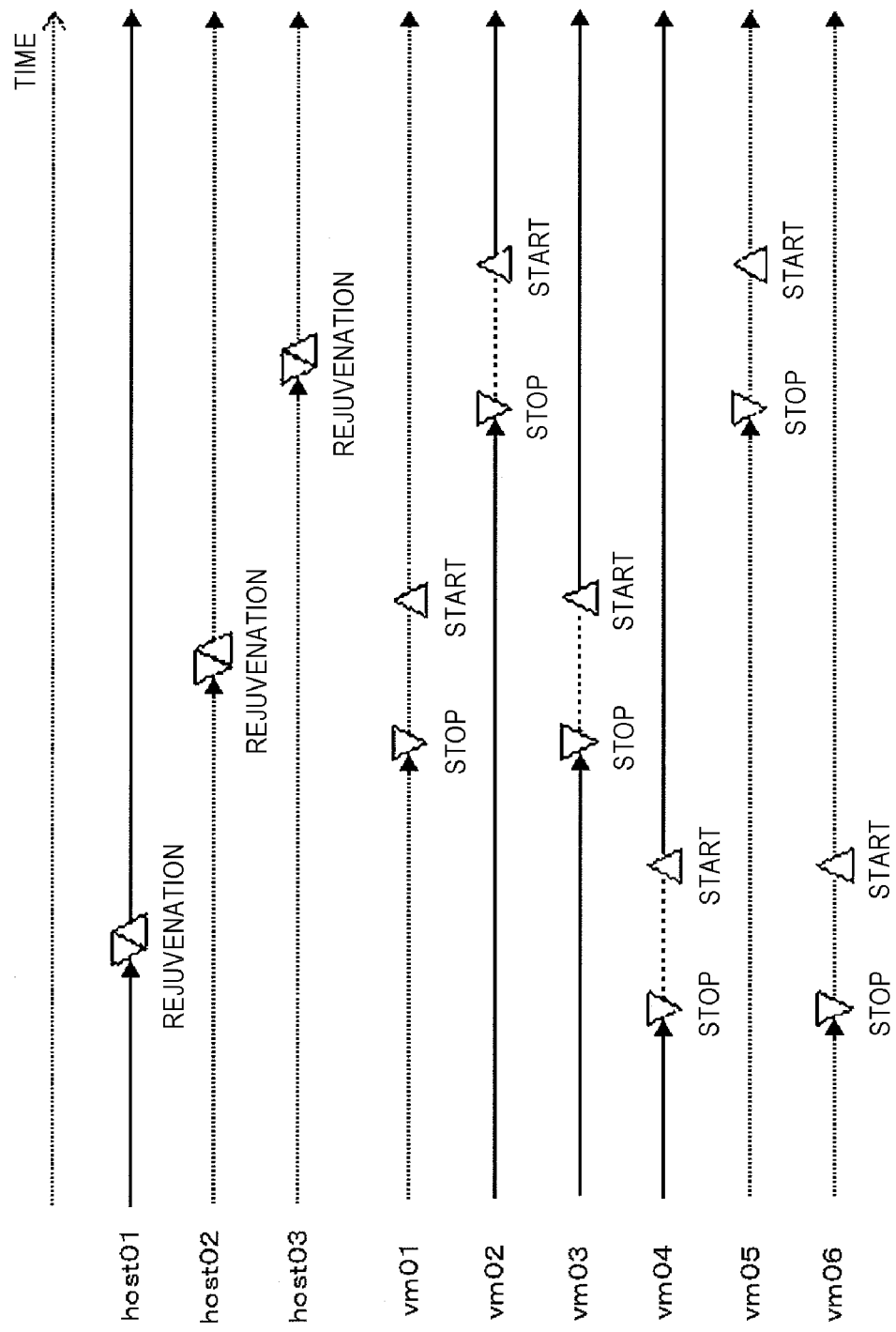
FIG. 5 is a time chart illustrating a rejuvenation schedule of the host machine and the virtual machine.

On the assumption that the free capacity does not exist in the arrangement configuration shown in FIG. 3, an example of the rejuvenation schedule in which the host machine 3 and the virtual machine 302 are combined is shown in FIG. 5. Referring to FIG. 5, vm04 and vm06 are selected and stopped at the timing of rejuvenating host01, vm01 and vm03 are selected and stopped at the timing of rejuvenating host02, and vm02 and vm05 are selected and stopped at the timing of stopping host03.

Figure 6:
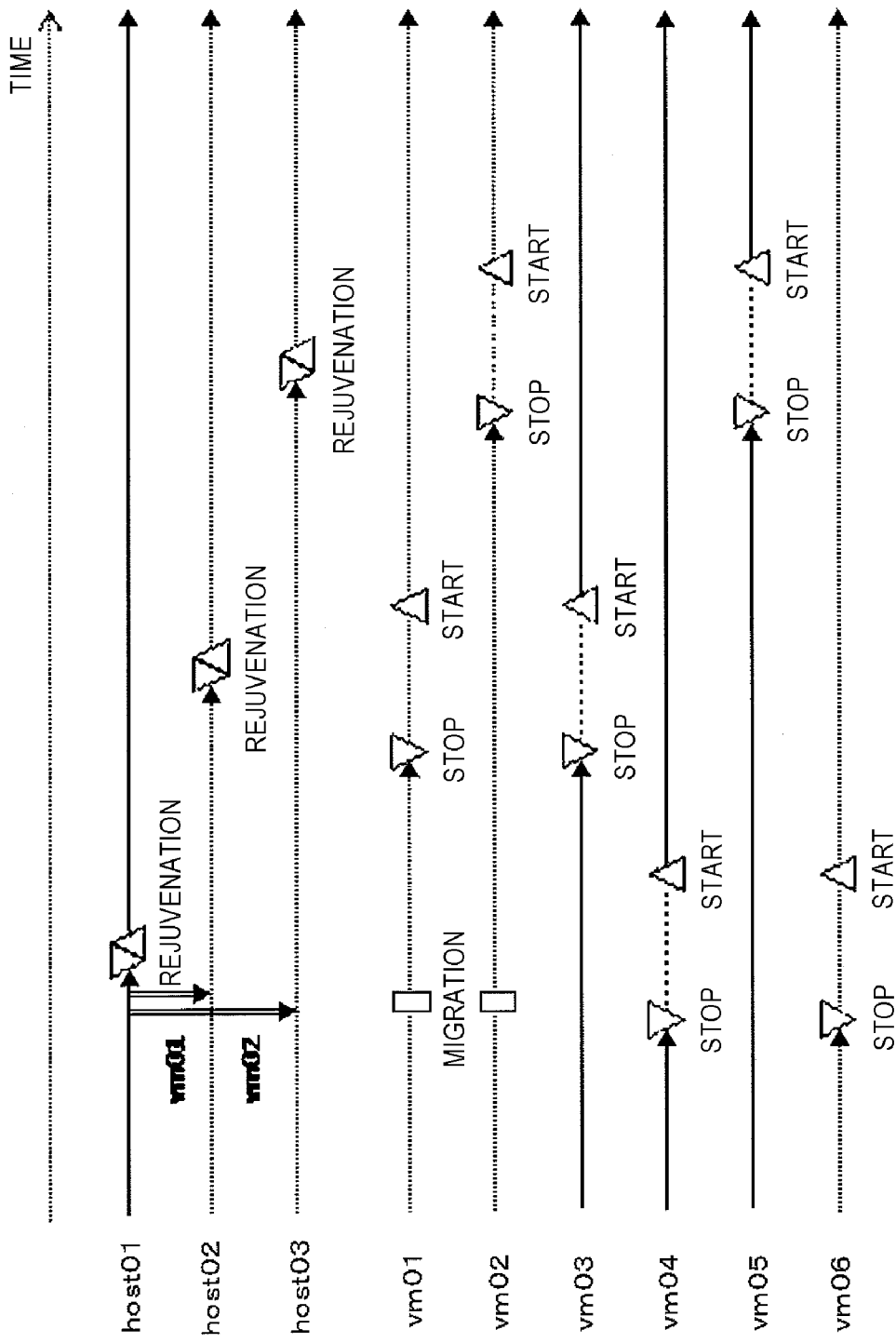
FIG. 6 is a time chart illustrating a rejuvenation schedule of the host machine and the virtual machine and a migration schedule of the virtual machine.

An example of the state in which the schedule of the migration of the virtual machine 302 is further added to the rejuvenation schedule of FIG. 5 is shown in FIG. 6. In the example of FIG. 6, at the time of the rejuvenation of host01, vm01 is migrated to host02, and vm02 is migrated to host03.

Thereafter, at the time of rejuvenation of host02, vm01 and vm03 operate on host02, and thus the migration is not required. Similarly, at the time of rejuvenation of host03, vm02 and vm05 operates on host03, and thus the rejuvenation is not required.

In the management server 1 of the rejuvenation processing system according to the embodiment, at least one host machine which is rejuvenated is selected from a plurality of host machines 3 as described above. At least one host machine which is not rejuvenated is selected from the virtual machine 302 operating in the selected and rejuvenated host machine 3, and at least one host machine which is rejuvenated is selected from the virtual machine 302 operating in the host machine 3 which is not selected and not rejuvenated.

The virtual machine 302 which is not rejuvenated of the rejuvenated host machine 3 and the rejuvenated virtual machine 302 of the host machine 3 which is not rejuvenated are mutually migrated. The migrated virtual machine 302 to be rejuvenated is rejuvenated together with the host machine 3 to be rejuvenated.

For this reason, when the virtual machine 302 necessary to be rejuvenated is rejuvenated together with the host machine 3 necessary to be rejuvenated, it is not necessary to stop all the virtual machines 302 which operate at the time of rejuvenating the host machine 3 and are not necessary to be rejuvenated.

Therefore, it is possible to simultaneously rejuvenate the host machine 3 and the virtual machine 302 which are necessary to be rejuvenated, while continuously operating the host machine 3 and the virtual machine 302 which are necessary to be rejuvenated.

That is, since the virtual machines 302 necessary to be rejuvenated at the time of rejuvenating the host machine 3 are rejuvenated in combination thereof, it is possible to reduce the number of unnecessary rejuvenation processes of the virtual machines 302.

Further, since the rejuvenation schedules of all of the host machines 3 and the virtual machines 302 are generated without using a preliminary server for performing the rejuvenation, it is possible to achieve high reliability through the rejuvenation at lower costs.

Meanwhile, the invention is not limited to the above-mentioned embodiment, but permits various types of modifications to be made without departing from the gist. For example, in the above-mentioned embodiment, it is exemplified that the management server includes the aging characteristics 102 in which the aging characteristics are registered beforehand for each of a plurality of host machines 3, and the host machine rejuvenation schedule 104 selects the host machine 3 rejuvenated in response to the aging characteristics as shown in FIG. 5.

However, the management server includes the aging characteristics 102 that detects and records the aging state in real time for each of a plurality of host machines 3, and the host machine rejuvenation schedule 104 may select the host machine 3 rejuvenated in response to the recorded aging state.

Figure 7:
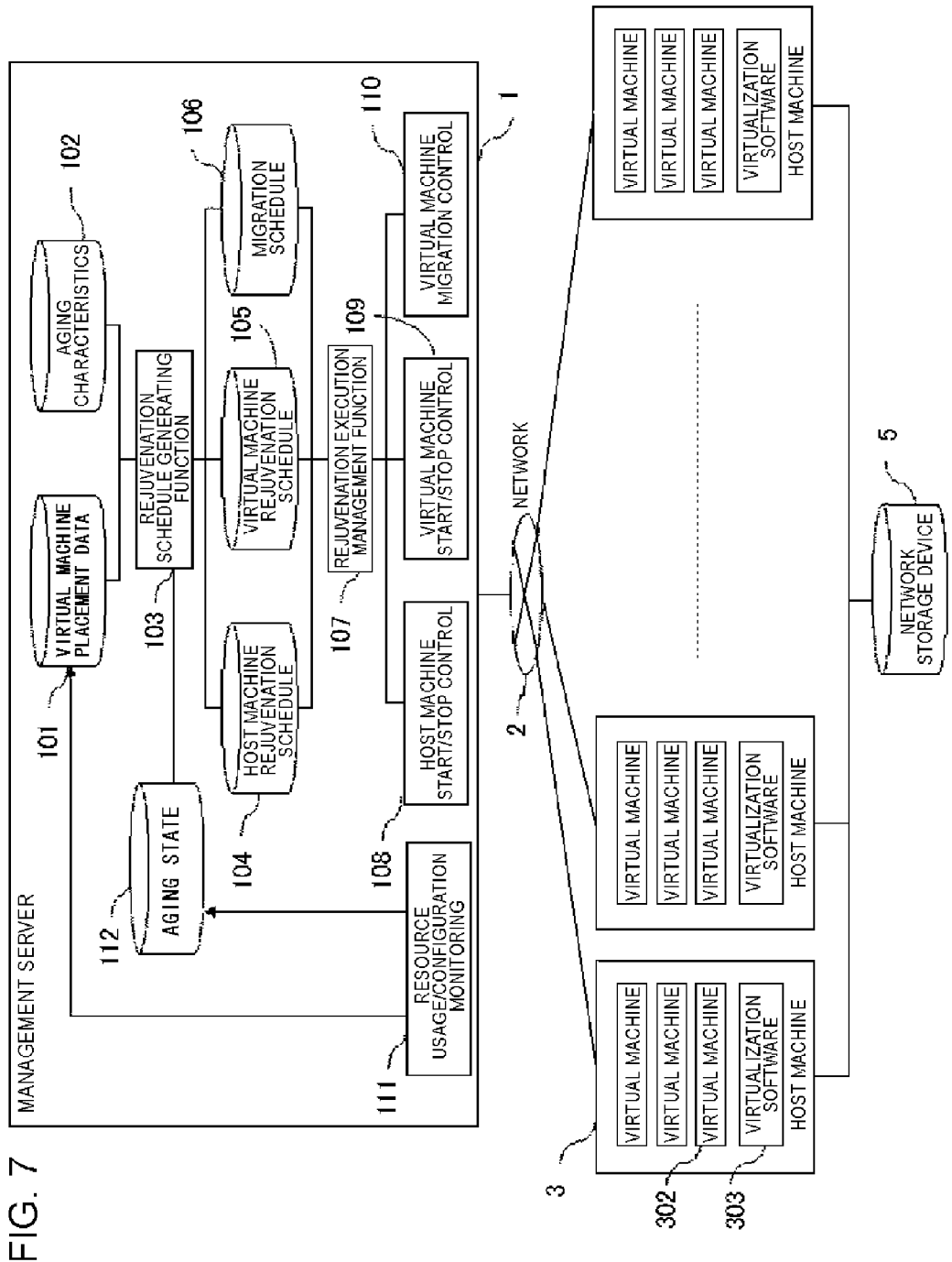
FIG. 7 is a schematic block diagram illustrating a logical structure of a rejuvenation processing system according to a modified example.

More specifically, referring to FIG. 7, the management server 1 further includes an aging state 112 and a resource usage/configuration monitoring function 111 as a component, in addition to the configuration of the management server of FIG. 1.

Next, an operation of the entire embodiment will be described in detail with reference to a flow diagram of FIG. 8. In the embodiment, the configuration and the aging state of the virtual machine 302 or the host machine 3 are continuously monitored, and the rejuvenation schedule is dynamically changed on the basis of the monitoring result.

First, the rejuvenation schedule generating function 103 generates the host machine rejuvenation schedule 104, the virtual machine rejuvenation schedule 105, and the migration schedule 106, according to the rejuvenation schedule generating method of the first embodiment.

An operation is initiated on the basis of the generated schedule, and simultaneously, the resource usage and configuration information are monitored using the resource usage/configuration monitoring function (steps 4000 and 4001 of FIG. 8).

As a result of monitoring, data which possibly can be aged by data such as the resource usage are recorded in the aging state 112 (step 4002). When it is obvious that a change occurs in the arrangement of the virtual machine 302 through monitoring, the virtual machine placement data 101 is updated (step 4003).

Here, unlike an aging progress state assumed at the time of the creation of the schedule, when an unforeseen aging state is found, the rejuvenation schedule is regenerated so as to rejuvenate a component in which aging progresses in a little while (steps 4004-Y and 4006).

For example, when the online application such as the Web Server is an application in which the aging progresses depending on the number of received requests, there may be a case in which the aging accelerates by the request concentration even in a short time.

Such a state is detected to thereby serve as a trigger of the rejuvenation schedule regeneration. In addition, even when an unforeseen configuration change other than the migration and the like previously scheduled is detected, the rejuvenation schedule is regenerated as well (steps 4005-Y and 4006).

For example, when the new virtual machine 302 or the host machine 3 is additionally operated, or when the arrangement configuration of the virtual machine 302 is changed by the migration for the purpose of a load balance and the like, the regeneration of the rejuvenation schedule is performed.

The rejuvenation schedule obtained by the regeneration is stored in the host machine rejuvenation schedule 104, the virtual machine rejuvenation schedule 105, and the migration schedule 106, respectively (step 4007), and the schedule operation is continued by the rejuvenation execution management function 107. When rescheduling is not needed, monitoring is continued.

Since such a rejuvenation processing system is configured to detect the unexpected aging progress state by monitoring the resource usage, and regenerate the rejuvenation schedule, it is also possible to dynamically respond to the situation in which the aging progresses due to a factor other than the elapsed time.

In addition, in the best mode for carrying out the invention, the change of the unexpected virtual machine placement data 101 is further detected by monitoring the configuration information, and the rejuvenation schedule is regenerated.

For this reason, it is possible to respond by dynamically changing the rejuvenation schedule in the environment where a function operates such as the automatic change of position of the virtual machine 302 for the purpose of the addition or the load balance of the host machine 3 or the virtual machine 302 by a system manager.

Meanwhile, the embodiment and a plurality of modified examples mentioned above can be naturally combined in the range consistent with the contents thereof. In addition, in the embodiment and modified examples mentioned above, although the structure and the like of each part have been specifically described, it is possible to variously change the structure and the like in the range that satisfies the invention.

The invention claimed is:

1. A rejuvenation processing device that controls a plurality of host machines in which a plurality of virtual machines operates, comprising:
    a management server that selects a first host machine as an object to be rejuvenated from among the plurality of host machines, selects at least one first virtual machine from among virtual machines operating in a second host machine which is not selected as the object to be rejuvenated from among the plurality of host machines, stops the operation of the at least one first virtual machine and migrates at least one second virtual machine operating in the at least one first host machine to the second host machine, and rejuvenates the at least one first host machine selected as the object to be rejuvenated after the virtual machine migration unit migrates the at least one second virtual machine to the second host machine.

2. The rejuvenation processing device according to claim 1, wherein the management server selects the first host machine which is rejuvenated by determining an aging state for each of the plurality of host machines.

3. The rejuvenation processing device according to claim 2,
    wherein aging characteristics are registered in the management server beforehand for each of the plurality of host machines, and
    wherein the management server selects the first host machine which is rejuvenated in response to the aging characteristics.

4. The rejuvenation processing device according to claim 2,
    wherein the management server detects and records the aging state in real time for each of the plurality of host machines, and
    wherein the management server selects the first host machine which is rejuvenated in response to the recorded aging state.

5. The rejuvenation processing device according to claim 1, wherein the management server selects the at least one first virtual machine which is rejuvenated and the at least one second virtual machine which is not rejuvenated by determining an aging state for each of the plurality of virtual machines.

6. The rejuvenation processing device according to claim 5,
    wherein aging characteristics are registered in the management server beforehand for each of the plurality of host machines, and
    wherein the management server selects the at least one first virtual machine which is rejuvenated in response to the aging characteristics.

7. The rejuvenation processing device according to claim 5,
    wherein the management server detects and records the aging state in real time for each of the plurality of virtual machines, and
    wherein the virtual rejuvenation scheduling unit selects the at least one first virtual machine which is rejuvenated and the at least one second virtual machine which is not rejuvenated in response to the recorded aging state.

8. The rejuvenation processing device according to claim 1,
    wherein the management server selects the at least one first virtual machine to be rejuvenated from among the virtual machines operating in the second host machine;
    wherein the management server migrates the at least one first virtual machine from the second host machine to the first host machine; and
    wherein the management server rejuvenates the first host machine after the virtual machine migration unit migrates the at least one first virtual machine to the first host machine.

9. The rejuvenation processing device according to claim 1,
    wherein the management server selects the at least one second virtual machine as an object not to be rejuvenated from among the virtual machines operating in the first host machine; and wherein the management server migrates the selected virtual machine as the at least one second virtual machine to the second host machine.

10. A rejuvenation processing system comprising:
   a plurality of host machines in which a plurality of virtual machines operates; and
   a management server that selects a first host machine as an object to be rejuvenated from among the plurality of host machines, selects at least one first virtual machine from among virtual machines operating in a second host machine which is not selected as the object to be rejuvenated from among the plurality of host machines, stops the operation of the at least one first virtual machine and migrates at least one second virtual machine operating in the at least one first host machine to the second host machine, and rejuvenates the at least one first host machine selected as the object to be rejuvenated after the virtual machine migration unit migrates the at least one second virtual machine to the second host machine.

11. A non-transitory information storage medium storing a computer program of a rejuvenation processing device that controls a plurality of host machines in which a plurality of virtual machines operates, the program causing the rejuvenation processing device to execute:
   a host rejuvenation scheduling process of selecting a first host machine as an object to be rejuvenated from among the plurality of host machines;
   a virtual rejuvenation scheduling process of selecting at least one first virtual machine from among virtual machines operating in a second host machine which is not selected as the object to be rejuvenated from among the plurality of host machines;
   a virtual migration process of stopping the operation of the at least one first virtual machine and migrating at least one second virtual machine operating in the at least one first host machine to the second host machine; and
   a rejuvenation execution process of rejuvenating the at least one first host machine selected as the object to be rejuvenated after the virtual machine migration process migrates the at least one second virtual machine to the second host machine.

12. A data processing method of a rejuvenation processing device that controls a plurality of host machines in which a plurality of virtual machines operates, comprising:
   a host rejuvenation scheduling operation of selecting a first host machine as an object to be rejuvenated from among the plurality of host machines;
   a virtual rejuvenation scheduling operation of selecting at least one first-virtual machine from among virtual machines operating in a second-host machine which is not selected as the object to be rejuvenated from among the plurality of host machines;
   a virtual migration operation of stopping the operation of the at least one first-virtual machine and migrating at least one second virtual machine operating in the at least one first host machine to the second host machine; and
   a rejuvenation execution operation of rejuvenating the at least one first host machine selected as the object to be rejuvenated after the virtual machine migration process migrates the at least one second virtual machine to the second host machine.

\* \* \* \* \*